United States Patent [19]

Neyret

[11] 4,350,852
[45] Sep. 21, 1982

[54] BI-STABLE MECHANISM AND ANTI-THEFT DEVICE FOR A MOTOR VEHICLE COMPRISING SUCH MECHANISM

[75] Inventor: Guy Neyret, Oullins, France

[73] Assignee: Sodex-Magister, Societe d'Exploitation des Brevets Neiman, Croissy, France

[21] Appl. No.: 212,774

[22] Filed: Dec. 4, 1980

[30] Foreign Application Priority Data

Dec. 7, 1979 [FR] France .............................. 79 30061

[51] Int. Cl.³ ............................................. H01H 27/06
[52] U.S. Cl. ............................................ 200/42 A; 200/67 A
[58] Field of Search .................... 200/42 A, 44, 67 A; 74/97, 100 R

[56] References Cited

U.S. PATENT DOCUMENTS

| | | | |
|---|---|---|---|
| 2,529,716 | 11/1950 | Vaksvik et al. | 200/67 A |
| 2,548,103 | 4/1951 | French | 200/67 A |
| 3,172,968 | 3/1965 | Arendt | 200/44 |
| 3,519,776 | 7/1970 | Slater | 200/67 A |
| 3,539,737 | 11/1970 | Schupp | 200/44 |
| 3,621,159 | 11/1971 | Heap | 200/44 |
| 4,117,280 | 9/1978 | Feaster | 200/67 A |

Primary Examiner—John W. Sheppard
Attorney, Agent, or Firm—James C. Wray

[57] ABSTRACT

The invention relates to a bi-stable (toggle) mechanism for a vehicle anti-theft device comprising a lever 5 pivotally mounted by a shaft 6, the said lever being subject to the action of a spring 10 and movable from one stable position through a center position to a second stable position.

In the mechanism according to the invention, the said spring 10 consists of a hairpin type spring of which one end 9 is connected to one end of the said lever 10 and the other end 11 mounted so as to pivot at a fixed point 12. The distance between the ends 9, 11 of the spring 10 when the lever 5 is in either stable position is greater than the distance between the point 12 of location of the spring 10 and the point of engagement of the spring end 9 with the lever end when the lever 5 is at its center position whereby the spring becomes more compressed as the lever approaches the center position where the lever is unstable. The distance between the two ends 9, 11 of the hairpin spring 10 is less than half that length of the lever 5 which is included between its shaft 6 and the point 12 at which the hairpin spring 10 is located.

1 Claim, 12 Drawing Figures

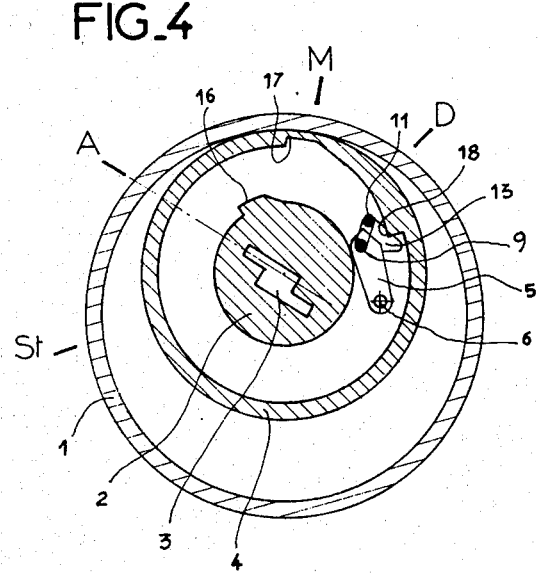
FIG_4
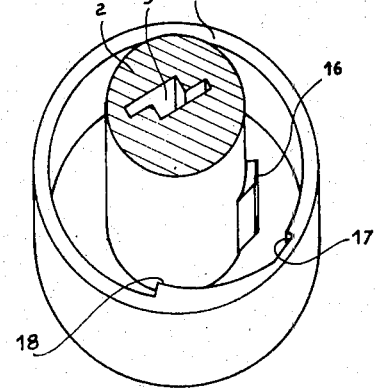
FIG_5
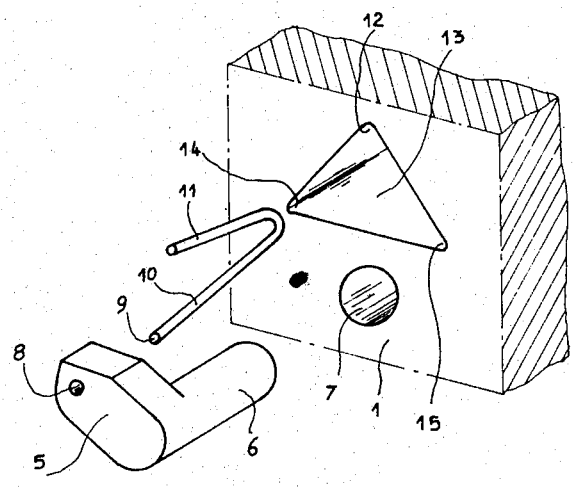
FIG_6

FIG._7
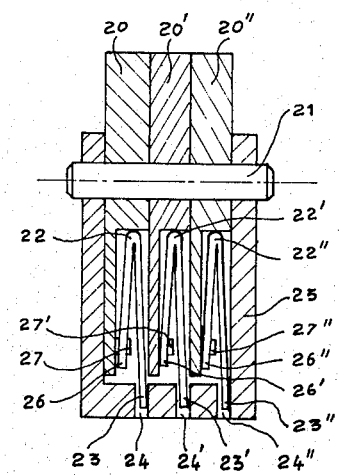
FIG._8
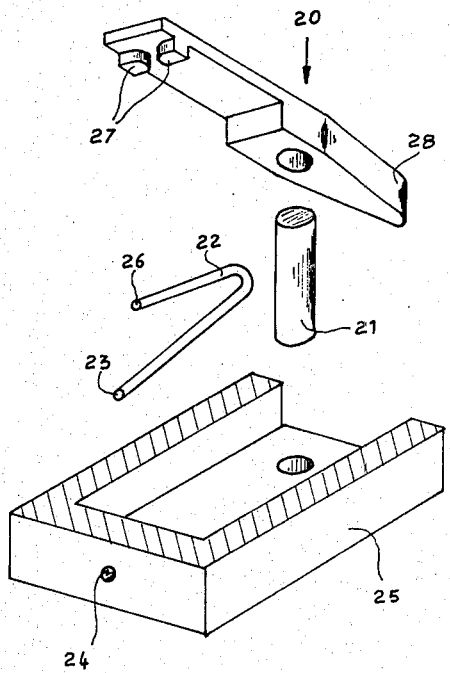
FIG._9
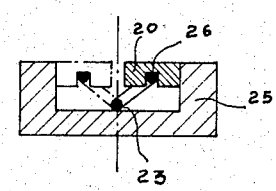

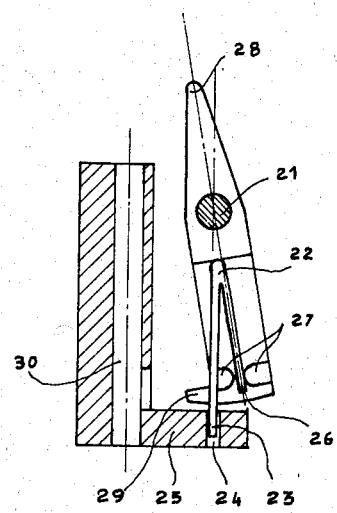
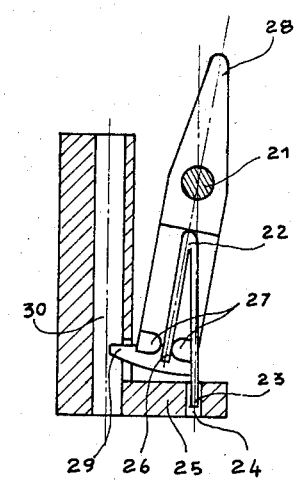
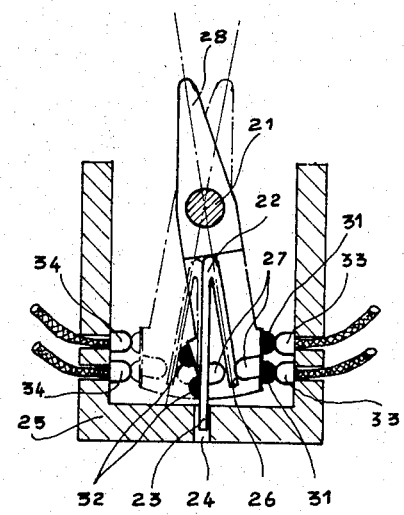

BI-STABLE MECHANISM AND ANTI-THEFT DEVICE FOR A MOTOR VEHICLE COMPRISING SUCH MECHANISM

BACKGROUND TO THE INVENTION

The invention concerns a bi-stable mechanism and its application to anti-theft device for motor vehicles.

There is considerable need for an extremely simple, economical and robust mechanical device capable of ensuring, in a simple and reliable manner, two stable positions. The purpose of the present invention is to provide such a device, particularly for the car lock industry.

According to the invention we provide a bi-stable mechanism comprising a housing, a lever pivotally mounted in said housing about an axis and movable between first and second stable positions, a spring for urging said lever towards one of said stable positions according to selection, said spring being a hairpin-type spring of which one end is connected to one end of the said lever and the other end mounted so as to pivot at a fixed point, the distance between the ends of the spring when the lever is in either stable position is greater than the distance between the point of location of the spring and the point of engagement of the spring end with the lever end when the lever is at its centre position whereby the spring becomes more compressed as the lever approaches the centre position where the lever is unstable.

The new bi-stable (toggle) mechanism to which the invention relates, which uses a hairpin spring, occupies very little space and at the same time provides considerable amplitude of movement, owing to the small distance between the two ends of the hairpin spring.

BRIEF DESCRIPTION OF THE DRAWINGS

The invention will be clearly understood from a perusal of the following description, by reference to the attached drawing, in which:

FIGS. 2-4 are similar to FIG. 1 but apply to different positions of the lock.

FIG. 5 is a schematic view, in perspective and partly in section, of the rotor of the lock shown in FIGS. 1-4;

FIG. 6 is an exploded view, in perspective, of the bi-stable device used in the lock shown in FIGS. 1-5.

FIG. 7 is an axial section through a device to give passage to pieces having lock elements using bi-stable devices according to a second embodiment of the invention.

FIG. 8 is an exploded schematic view, in perspective and partially in section, of a part of the device shown in FIG. 7.

FIG. 9 is a cross section of the assembly shown in FIG. 8.

FIG. 10 is a plan view, partly in section, of the assemblies shown in FIGS. 8 and 9, for one of the stable positions.

FIG. 11 is analogous to FIG. 10 but for another stable position.

FIG. 12 is a plan view, partly in section, of an electric switch using a bistable device according to the second embodiment of the invention.

DESCRIPTION OF PREFERRED EMBODIMENT

Figure 1:
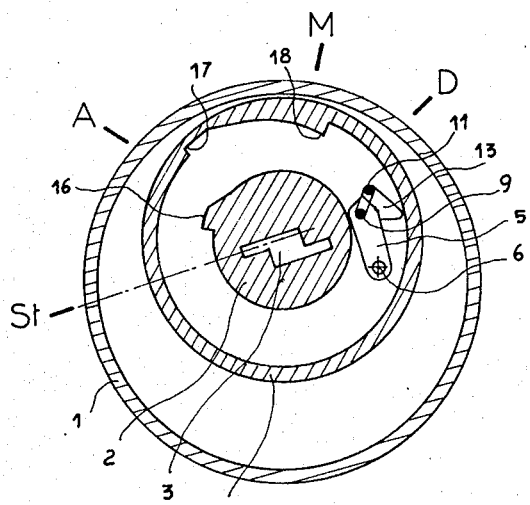
FIG. 1 is a schematic section through the diameter of an anti-theft lock equipped with a bi-stable device in accordance with one embodiment of the invention.

Reference will first of all be made to FIGS. 1-6, illustrating an anti-theft lock for a motor vehicle, comprising a body 1 in which is journaled a rotor 2 provided with an axial key groove 3 and with which a cam 4 is integral. The rotor may occupy a first "stop" position (FIG. 1) in which the vehicle is blocked and the electrical circuits open, a second "starting" position (FIG. 2) in which the starter of the vehicle is supplied with current, a third "running" position (FIG. 3) in which the vehicle is able to travel, the electric circuits being closed and the starter not being supplied with current, and a fourth "accessories" position (FIG. 4) in which the vehicle is unblocked but only the electrical circuits of the accessories are closed.

A restoring spring (not shown) automatically returns the rotor from the second to the third position as soon as the key is released, in order to avoid the supply of current to the starter while the engine is running. A device is provided for the purpose of ensuring that no direct return to the "starting" position can occur before passing through the "accessories" position, in order to protect the starter. In the example described this device uses a bi-stable mechanical device in accordance with a first embodiment of the invention, interacting with a control profile borne by the cam 4.

The bi-stable mechanical device consists of a lever 5 which pivots about a shaft 6 journalled in a boring 7 of the body 1, the shaft 6 being adjacent to one end of the lever 5. The other end of the lever 5 possesses a hole 8 which accommodates one end 9 of a hairpin-type spring 10 of which the other end 11 is journalled at a point 12 on the body 1.

In the example shown (see FIG. 6) the point 12 is the apex of a triangular cut-out 13 formed in the body 1, the other two points 14 and 15 of the triangle serving as a stop for that branch 10 of the spring which is adjacent to the end 9. The lever 5 can thus assume two stable positions. In the first position (FIGS. 1 and 4) the end 9 is at the point 14 of the triangle 13. In the second stable position (FIG. 3) the end 9 is at the point 15. These two positions are stable as a result of the fact that the movable point 9 is not aligned with the points 6 and 11.

Figure 2:
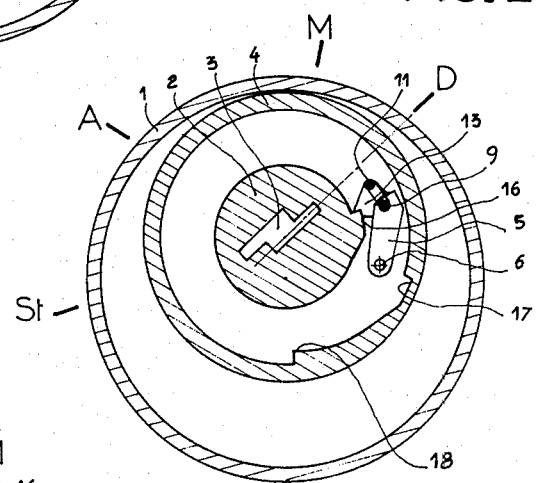
Figure 3:
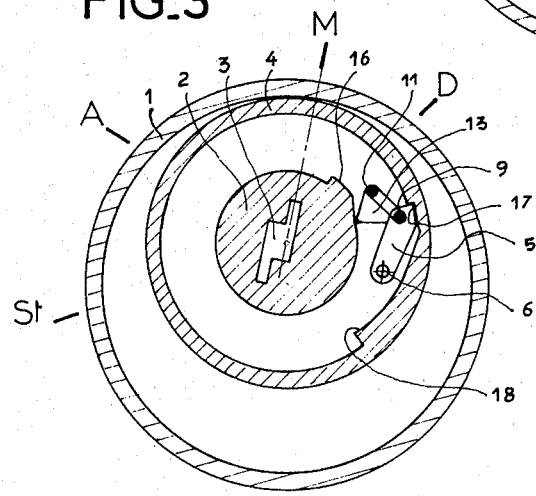

The adjustment from the first to the second position is made by the action, on the lever 5, of a boss 16 borne by the rotor 2 (FIGS. 1 and 2). When the rotor returns to the "running" position (FIG. 3), that end of the lever 5 which is adjacent to the point 9 engages a notch 17 provided on the cam 4. The rotor can no longer be returned direct to the "starting" position. If the rotor is returned to the "accessories" position (FIG. 4), a boss 18 of the cam 4 moves the lever 5 back to its first stable position, which then enables the rotor to be returned to the "starting" position. In the intermediate positions, that end of the lever 5 which is adjacent to the point 11 slides along the surface of the cam, which constitutes a "waiting" position (FIG. 2).

The distance between the ends 9,11 of the spring 10 when the lever 5 is in either stable position is greater than the distance between the point 12 of location of the spring 10 and the point of engagement of the spring end 9 with the lever end when the lever 5 is at its centre position whereby the spring becomes more compressed as the lever approaches the centre position where the lever is unstable. The distance between the two ends 9,11 of the hairpin spring 10 is less than half that length of the lever 5 which is included between its shaft 6 and the point 12 at which the hairpin spring 10 is located.

The hairpin spring 10, which in the example illustrated in perpendicular to the plane of the lever 5, has its two ends very close to each other, so that despite the limited rotation amplitude of the lever 5 the spring has a considerable angular rotation amplitude, ensuring excellent stability for the extreme positions.

This same property is to be found in the versions shown in FIGS. 7 and 12, in which the spring is situated in the plane of the lever. are mounted adjacent to one another and in such a way as to rotate about one common shaft 21 and are subjected to the action of hairpin springs 22,22', 22", respectively. The springs have ends 23, 23', 23", accommodated in holes 24, 24',24", respectively, of a box 25. In other end 26, 26', 26", of each spring is held between two bosses 27, 27', 27", as the case may be, of the corresponding lever, in order to be integral therewith. The passage from one of the two stable positions shown in FIGS. 10 and 11 to the other is effected by action on that end 28 of the lever 20 which is opposite to the bosses 27. In the first position (FIG. 10) a heel 29 of the lever 20 does not obstruct a channel 30 giving passage through the body 25. In the second position (FIG. 11), on the other hand, the heel 29 obstructs the channel 30.

In the example shown in FIG. 12, in which the same reference number as before is retained for any component already appearing in FIGS. 7-11, the lever 20 bears two sets of movable contacts 31 and 32. In a first stable position, shown in full lines, the contacts 31 interact with fixed contacts 33 of the box 25. In the second stable position, shown in dotted lines, the contacts 32 interact with a second set of fixed contacts 34 of the box 25. The contactor thus formed can be actuated by means of a cam acting on the end 28 of the lever 20.

The bi-stable device can in all cases be actuated by the direct interaction of a control device, such as a cam, with the hairpin-type spring, instead of by its action on the lever.

I claim:

1. A bi-stable mechanism comprising:
   (a) a housing,
   (b) a lever pivotally mounted in said housing about an axis and movable between first and second stable positions, and
   (c) a spring for urging said lever towards one of said stable positions according to selection, said spring being of a hairpin-type spring of which one end is connected to one end of the said lever and the other end mounted so as to pivot at a fixed point, the distance between the ends of the spring when the lever is in either stable position is greater than the distance between the point of location of the spring end with the lever end when the lever is at its centre position whereby the spring becomes more compressed as the lever approaches the centre position where the lever is unstable; the pivoted leg of the hairpin spring being accommodated at the apex of a triangular cut-out of said housing, while the other leg of the spring can come to rest at either of the other two points of the triangular cut-out.

* * * * *